(12) United States Patent
Onaka et al.

(10) Patent No.: US 12,344,458 B2
(45) Date of Patent: Jul. 1, 2025

(54) STORAGE CONTAINER FOR TAB LEAD, AND COMBINATION OF TAB LEAD AND STORAGE CONTAINER

(71) Applicant: SUMITOMO ELECTRIC INDUSTRIES, LTD., Osaka (JP)

(72) Inventors: Nozomi Onaka, Tochigi (JP); Noriaki Abe, Tochigi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 224 days.

(21) Appl. No.: 18/224,305

(22) Filed: Jul. 20, 2023

(65) Prior Publication Data

US 2024/0025632 A1     Jan. 25, 2024

(30) Foreign Application Priority Data

Jul. 22, 2022   (JP) ................. 2022-117124

(51) Int. Cl.
    *B65D 85/00*     (2006.01)
    *B65D 25/04*     (2006.01)
    *B65D 43/02*     (2006.01)
    *B65D 85/62*     (2006.01)

(52) U.S. Cl.
    CPC ............. *B65D 85/54* (2013.01); *B65D 25/04* (2013.01); *B65D 43/0202* (2013.01); *B65D 85/62* (2013.01); *B65D 2543/00203* (2013.01); *B65D 2543/00537* (2013.01)

(58) Field of Classification Search
CPC .... B65D 85/54; B65D 25/04; B65D 43/0202; B65D 85/62; B65D 2543/00203; B65D 2543/00537; B65D 2543/00194; B65D 2543/00296; B65D 2543/00527; B65D 2543/00611; B65D 2543/00703; B65D 2543/00731; B65D 2543/00814; B65D 2585/86; B65D 25/02; B65D 43/02; B65D 25/10; B65D 85/00; B65D 21/02; B65D 85/30; Y02E 60/10; H01M 50/291; H01M 50/531; H01M 50/543; H01M 50/20; H01M 50/244

See application file for complete search history.

(56) References Cited

U.S. PATENT DOCUMENTS

2023/0070569 A1    3/2023    Onaka et al.

FOREIGN PATENT DOCUMENTS

| | | | |
|---|---|---|---|
| JP | 2013052909 A | * | 3/2013 |
| JP | 2021-128896 A | | 9/2021 |
| KR | 20130112773 A | * | 10/2013 |

\* cited by examiner

*Primary Examiner* — Andrew D Perreault
(74) *Attorney, Agent, or Firm* — Renner, Otto, Boisselle & Sklar, LLP

(57) ABSTRACT

A container for a tab lead includes a main body part configured to contain a plurality of tab leads and a cover part configured to cover the main body part. The main body part has a pocket that has an inverted quadrangular pyramidal trapezoid shape having a bottom surface and four side surfaces, in which an area of an opening at an upper end of the pocket is larger than an area of the bottom surface. The pocket is configured such that a volume of a region occupied by portions, which are below an upper end of an insulating films of the plurality of tab leads, of the plurality of tab leads in a state in which the plurality of tab leads are contained in the pocket is included within a range of 70% to 90% of a volume of the pocket.

6 Claims, 8 Drawing Sheets

STORAGE CONTAINER FOR TAB LEAD, AND COMBINATION OF TAB LEAD AND STORAGE CONTAINER

CROSS-REFERENCE TO RELATED APPLICATIONS

This application is based upon and claims the benefit of priority from Japanese Patent Application No. 2022-117124, filed Jul. 22, 2022, the entire contents of which are incorporated herein by reference.

TECHNICAL FIELD

The present disclosure relates to a storage container (container) for a tab lead and a combination of a tab lead and a storage container.

BACKGROUND

In the related art, a tab lead that is used as a terminal for deriving electricity from a battery has been developed (refer to JP2021-128896A, for example).

SUMMARY

According to an aspect of the present invention, there is provided a container for a tab lead including:
 a main body part configured to contain a plurality of tab leads; and
 a cover part configured to cover the main body part,
 in which each of the tab leads comprises a conductor, which is a foil having a rectangular main surface, and an insulating film configured to cover a portion of the conductor and protruded from both ends in a width direction of the conductor,
 in which the main body part has a pocket,
 in which the pocket has an inverted quadrangular pyramidal trapezoid shape having a bottom surface and four side surfaces, in which an area of an opening at an upper end of the pocket is larger than an area of the bottom surface,
 in which a width of the bottom surface coincides with a width of the conductor of the tab lead in direction and length,
 in which the four side surfaces comprise a left side surface and a right side surface intersecting a straight line along a width direction of the bottom surface, and a front side surface and a rear side surface parallel to the straight line,
 in which the left side surface and the right side surface are not in contact with the insulating film of each of the tab leads in a state in which the plurality of tab leads are contained in the pocket,
 in which the front side surface is in contact with the insulating film of the tab lead closest to the front side surface in the state,
 in which the rear side surface is in contact with the insulating film of the tab lead closest to the rear side surface in the state,
 in which the left side surface and the right side surface each have a trapezoid where a bottom side is shorter than an upper side and all interior angles of the trapezoid formed by the bottom side and sides are obtuse angles, and
 in which the pocket is configured such that a volume of a region occupied by portions, which are below an upper end of the insulating films, of the plurality of tab leads in a state in which the plurality of tab leads are contained in the pocket is included within a range of 70% to 90% of a volume of the pocket.

According to another aspect of the present invention, there is provided a combination of a tab lead and a container including:
 a plurality of tab leads; and
 a container configured to contain the plurality of tab leads,
 in which the container comprises a main body part, and a cover part configured to cover the main body part,
 in which each of the tab leads comprises a conductor, which is a foil having a rectangular main surface, and an insulating film configured to cover a portion of the conductor and protruded from both ends in a width direction of the conductor,
 in which the main body part has a pocket,
 in which the pocket has an inverted quadrangular pyramidal trapezoid shape having a bottom surface and four side surfaces, in which an area of an opening at an upper end of the pocket is larger than an area of the bottom surface,
 in which a width of the bottom surface coincides with a width of the conductor of the tab lead in direction and length,
 in which the four side surfaces comprise a left side surface and a right side surface intersecting a straight line along a width direction of the bottom surface, and a front side surface and a rear side surface parallel to the straight line,
 in which the left side surface and the right side surface are not in contact with the insulating film of each of the tab leads in a state in which the plurality of tab leads are contained in the pocket,
 in which the front side surface is in contact with the insulating film of the tab lead closest to the front side surface in the state,
 in which the rear side surface is in contact with the insulating film of the tab lead closest to the rear side surface in the state,
 in which the left side surface and the right side surface each have a trapezoid where a bottom side is shorter than an upper side and all interior angles of the trapezoid formed by the bottom side and sides are obtuse angles, and
 in which the pocket is configured such that a volume of a region occupied by portions, which are below an upper end of the insulating films, of the plurality of tab leads in a state in which the plurality of tab leads are contained in the pocket is included within a range of 70% to 90% of a volume of the pocket.

DETAILED DESCRIPTION

Figure 1:
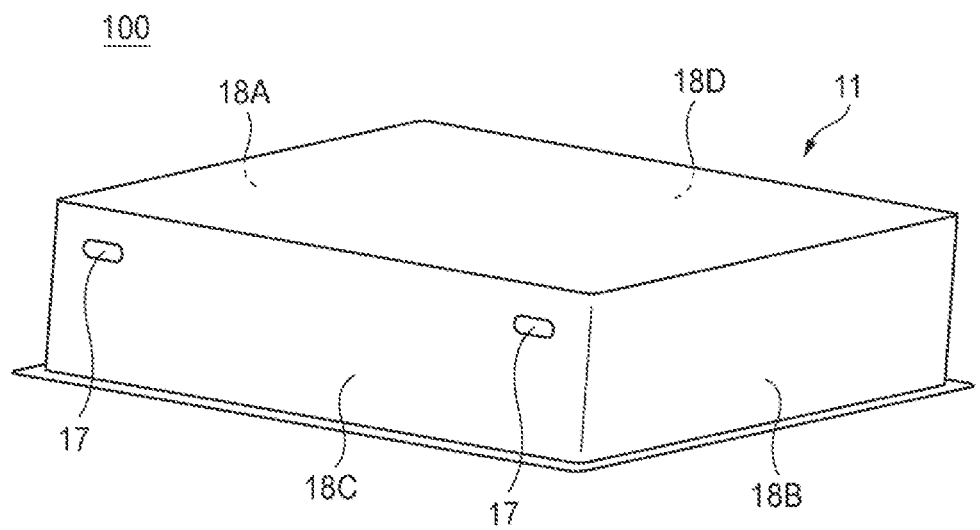
FIG. 1 shows an example of a storage container for a tab lead according to an embodiment of the present disclosure.
Figure 1:
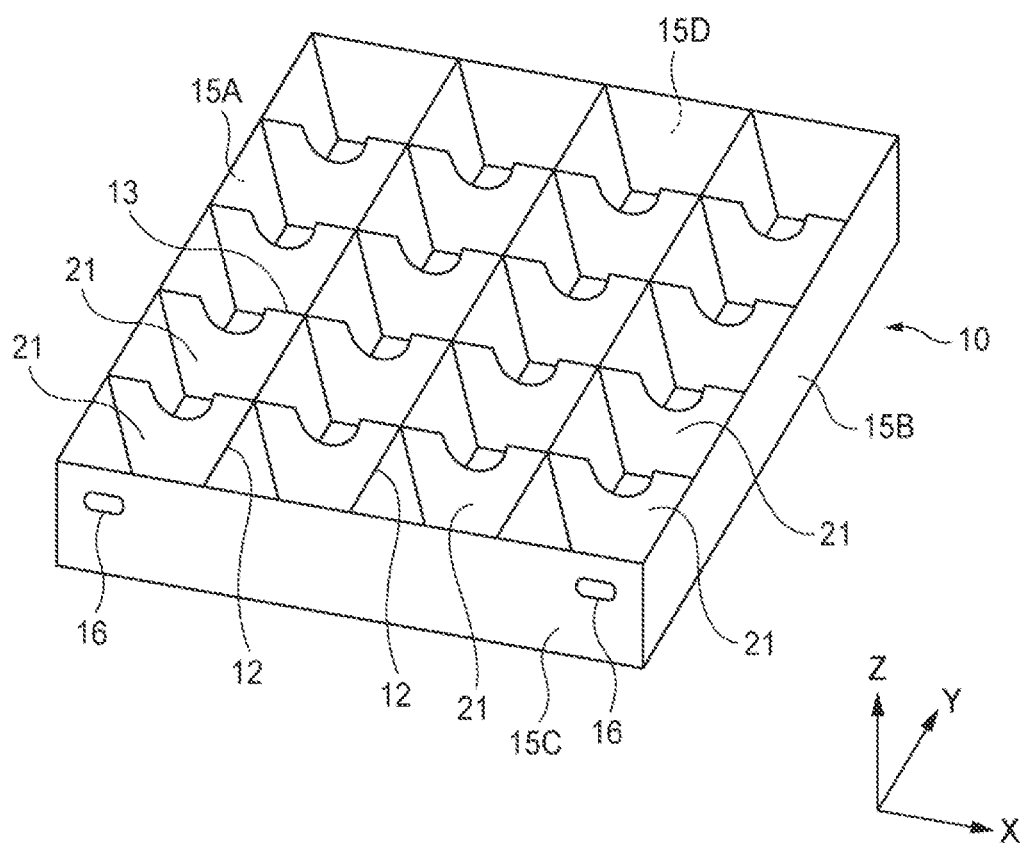

When storing and carrying a plurality of metal terminals such as tab leads in a container, it is desired to prevent the metal terminals from moving in the container due to vibration and being scratched or damaged.

The present disclosure is to provide a storage container (container) for a tab lead and a combination of a tab lead and a storage container (container) capable of preventing a tab lead from being scratched or damaged when storing and carrying a plurality of tab leads in a container.

According to the present disclosure, it is possible to prevent a tab lead from being scratched or damaged when storing and carrying a plurality of tab leads in a container.

Description of Embodiments of Present Disclosure

First, embodiments of the present disclosure are listed and described.

(1) A container for a tab lead according to an embodiment of the present disclosure includes a main body part configured to contain a plurality of tab leads, and a cover part configured to cover the main body part, in which each of the tab leads includes a conductor, which is a foil having a rectangular main surface, and an insulating film configured to cover a portion of the conductor and protruded from both ends in a width direction of the conductor, in which the main body part has a pocket, in which the pocket has an inverted quadrangular pyramidal trapezoid shape having a bottom surface and four side surfaces in which an area of an opening at an upper end of the pocket is larger than an area of the bottom surface, in which a width of the bottom surface coincides with a width of the conductor of the tab lead in direction and length, in which the four side surfaces include a left side surface and a right side surface intersecting a straight line along a width direction of the bottom surface, and a front side surface and a rear side surface parallel to the straight line, in which the left side surface and the right side surface are not in contact with the insulating film of each of the tab leads in a state in which the plurality of tab leads are contained in the pocket, in which the front side surface is in contact with the insulating film of the tab lead closest to the front side surface in the state, in which the rear side surface is in contact with the insulating film of the tab lead closest to the rear side surface in the state, in which the left side surface and the right side surface each have a trapezoid where a bottom side is shorter than an upper side and all interior angles of the trapezoid formed by the bottom side and sides are obtuse angles, and in which the pocket is configured such that a volume of a region occupied by portions, which are below an upper end of the insulating films, of the plurality of tab leads in a state in which the plurality of tab leads are contained in the pocket is included within a range of 70% to 90% of a volume of the pocket.

With such a configuration, when storing and carrying the plurality of tab leads in the container, the tab leads can be maintained without moving within the container. This makes it possible to prevent the tab leads from being scratched, damaged, or the like. In addition, the configuration in which the volume of the region occupied by the portions, which are below the upper end of the insulating films, of the contained tab leads is included within the range of 70% to 90% of the volume of the pocket allows a suitable space between the concave portion and the tab lead, thereby making it possible to easily remove and insert a bundle of tab leads with respect to the container.

(2) In the container for a tab lead according to the above (1), a cutout is formed at an upper end of each of the front and rear side surfaces, a portion of the conductor of the tab lead and a portion of the insulating film are exposed from the cutout in a state in which the plurality of tab leads are contained in the pocket, and no cutout is formed at a connecting portion of the side surfaces.

In this way, the configuration in which the cutouts are formed on the front and rear side surfaces of the pocket makes it possible to easily perform an operation by preventing an operator's finger from contacting the container when inserting and removing the bundle of tab leads with respect to the container. In addition, the configuration in which no cutout is formed at the connecting portion of the side surfaces of the pocket can enhance the strength of the pocket to prevent damage to the container.

(3) In the container for a tab lead according to the above (1) or (2), the main body part has a plurality of the pockets formed along a front-rear direction.

With such a configuration, a large number of tab leads can be contained and carried. In order to contain a large number of tab leads, it is also conceivable to lengthen a length of the pocket in the front-rear direction. However, as compared with a configuration in which the length of the pocket is increased in the front-rear direction, the configuration in which a plurality of pockets is provided makes it possible to easily perform an operation by storing the number of tab leads, which can be grasped at once, in one pocket. The strength of the container can be increased when a connecting portion of front and rear walls between the pockets is made into a surface.

(4) In the container for a tab lead according to any one of the above (1) to (3), the main body part has a plurality of the pockets formed along a left-right direction.

With such a configuration, a large number of tab leads can be contained and carried. In order to contain a large number of tab leads, as compared with a configuration in which the length of the pocket is increased in the front-rear direction, the configuration in which the plurality of pockets is provided makes it possible to easily perform an operation by storing the number of tab leads, which can be grasped at once, in one pocket. The strength of the container can be increased when a connecting portion of left and right walls between the pockets is made into a surface.

(5) In the container for a tab lead according to any one of the above (1) to (4), the main body part has the m pockets (m: a natural number of 2 or greater) formed along the front-rear direction, and the n pockets (n: a natural number of 2 or greater) formed along a left-right direction orthogonal to the front-rear direction.

With such a configuration, a large number of tab leads can be contained and carried. In addition, the configuration in which the plurality of pockets are provided in both the front-rear and left-right directions can avoid an elongated shape of the container and prevent the container from bending when the container is lifted, thereby making easier to handle the container.

(6) A combination of a tab lead and a container according to an embodiment of the present disclosure includes a plurality of tab leads and a container configured to contain the plurality of tab leads, in which the container includes a main body part, and a cover part configured to cover the main body part, in which each of the tab leads includes a conductor, which is a foil having a rectangular main surface, and an insulating film configured to cover a portion of the conductor and protruded from both ends in a width direction of the conductor, in which the main body part has a pocket, in which the pocket has an inverted quadrangular pyramidal trapezoid shape having a bottom surface and four side surfaces in which an area of an opening at an upper end of the pocket is larger than an area of the bottom surface, in which a width of the bottom surface coincides with a width of the conductor of the tab lead in direction and length, in which the four side surfaces include a left side surface and a right side surface intersecting a straight line along a width direction of the bottom surface, and a front side surface and a rear side surface parallel to the straight line, in which the left side surface and the right side surface are not in contact with the insulating film of each of the tab leads in a state in which the plurality of tab leads are contained in the pocket, in which the front side surface is in contact with the insulating film of the tab lead closest to the front side surface in the state, in which the rear side surface is in contact with the insulating film of the tab lead closest to the rear side surface in the state, in which the left side surface and the right side surface each have a trapezoid where a bottom side is shorter than an upper side and all interior angles of the trapezoid formed by the bottom side and sides are obtuse angles, and in which the pocket is configured such that a volume of a region occupied by portions, which are below an upper end of the insulating films, of the plurality of tab leads in a state in which the plurality of tab leads are contained in the pocket is included within a range of 70% to 90% of a volume of the pocket.

With such a configuration, when storing and carrying the plurality of tab leads in the container, the tab leads can be maintained without moving within the container. This makes it possible to prevent the tab leads from being scratched, damaged, or the like. In addition, the configuration in which the volume of the region occupied by the portions, which are below the upper end of the insulating films, of the contained tab leads is included within the range of 70% to 90% of the volume of the pocket allows a suitable space between the pocket and the tab lead, thereby making it possible to easily remove and insert a bundle of tab leads with respect to the container.

Details of Embodiments of Present Disclosure

A specific example of the storage container for a tab lead of the present disclosure will be described below with reference to the drawings. Note that the present invention is not limited to these examples, is defined by the claims and is intended to include all changes made within the meaning and scope equivalent to the claims.
(Overall Configuration of Storage Container)

FIG. 1 shows an example of a storage container for a tab lead according to an embodiment of the present disclosure. Referring to FIG. 1, a storage container 100 for a tab lead according to an embodiment of the present disclosure includes a main body part 10, and a cover part 11 that covers the main body part 10. The main body part 10 has a pocket 21 in which a tab lead 1 described later is contained. The main body part 10 and the cover part 11 are formed of resin.

As the resin for forming the main body part 10 and the cover part 11, polyethylene terephthalate (PET), polystyrene, polyethylene, polypropylene, or the like may be used. In terms of moldability and durability, polyethylene terephthalate is preferably used.

When the main body part 10 is made to have a thickness of 0.4 mm or greater, it is preferable in terms of strength as bending or twisting of the main body part 10 hardly occurs when a metal terminal such as the tab lead 1 is inserted therein and carried. On the other hand, since the material cost increases as the thickness of the main body part 10 increases, the thickness of the main body part 10 is preferably up to 2 mm. The main body part 10 and the cover part 11 can be produced by injection molding or vacuum molding in which molten resin is put into a mold.

Hereinafter, the positive direction of the X-axis shown in FIG. 1 is defined as the right direction, and the negative direction of the X-axis is defined as the left direction. In addition, the positive direction of the Y-axis shown in FIG. 1 is defined as the forward direction, and the negative direction of the Y-axis is defined as the rearward direction. The positive direction of the Z-axis shown in FIG. 1 is defined as the upward direction, and the negative direction of the Z-axis is defined as the downward direction.

The main body part 10 has m pockets 21 (m: a natural number of 2 or greater) formed along the front-rear direction, and n pockets 21 (n: a natural number of 2 or greater) formed along the left-right direction, for example. m and n may be numbers different from each other or may be the same number. In the example shown in FIG. 1, the main body part 10 has five pockets 21 formed along the front-rear direction and four pockets 21 formed along the left-right direction, and has a substantially square shape in a top view.

A first connecting portion 12 extending in the front-rear direction is provided between the pockets 21 aligned in the left-right direction. In addition, a second connecting portion 13 extending in the left-right direction is provided between the pockets 21 aligned in the front-rear direction.

Note that the pocket 21 is not limited to the configuration in which the plurality of pockets 21 are provided in both the front-rear direction and the left-right direction. For example, one pocket may be formed along the front-rear direction or n pockets may be formed along the left-right direction. Alternatively, m pockets may be formed along the front-rear direction, and one pocket may be formed along the left-right direction. In addition, the number of pockets 21 formed in the main body part 10 may be one.

The main body part 10 and the cover part 11 have a locking mechanism that engages each other in a state in which the cover part 11 covers the main body part 10. More specifically, the main body part 10 has four side surfaces 15, namely, a left side surface 15A, a right side surface 15B, a rear side surface 15C, and a front side surface 15D. At both end portions of each side surface 15 in the extension direction, first recessed fitting portions 16 are formed.

The cover part 11 has four side faces 18, namely, a left side surface 18A, a right side surface 18B, a rear side surface 18C, and a front side surface 18D. At both end portions of each side surface 18 in the extension direction, second fitting portions 17 are formed at positions corresponding to the plurality of first fitting portions 16 formed on the body part 10, respectively. In a state in which the cover part 11 covers the main body part 10, the plurality of second fitting portions 17 of the cover part 11 are fitted with the plurality of first fitting portions 16 corresponding to the second fitting portions, so that the cover part 11 is fixed with respect to the main body 10.

Note that a shape of the first fitting portion 16 and the second fitting portion 17 is not limited to an elliptical shape and may also be a rectangular shape or an angular rectangular shape. In addition, the first fitting portion 16 is not limited to being formed on all of the four side surfaces 15, and may be formed only on the left side surface 15A and the right side surface 15B, for example.

A length of each side surface 18 of the cover part 11 in the vertical direction is preferably substantially the same as a length of each side surface 15 of the main body part 10 in the vertical direction. With such a configuration, an area of each side surface 18 of the cover part 11 can be increased. Therefore, in a state in which a plurality of tab leads 1 are contained in the main body part 10 and the main body part is covered with the cover part 11, when the cover part 11 and the main body part 10 are lifted together, an upper surface of the cover part 11 can be prevented from bending or twisting.

(Configuration of Tap Lead)

Figure 2:
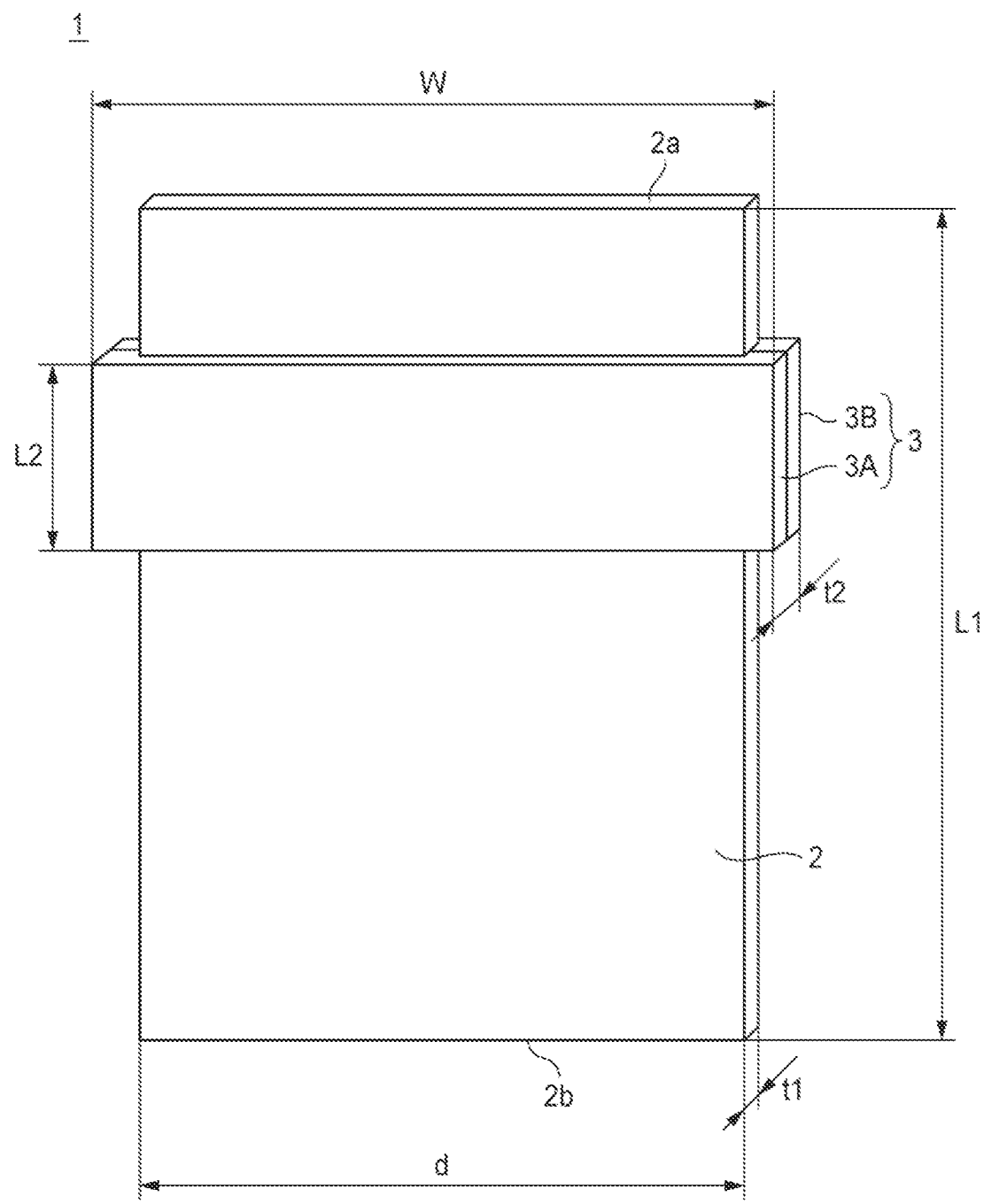
FIG. 2 is a perspective view showing a tab lead that is contained in the storage container shown in FIG. 1.
Figure 3:
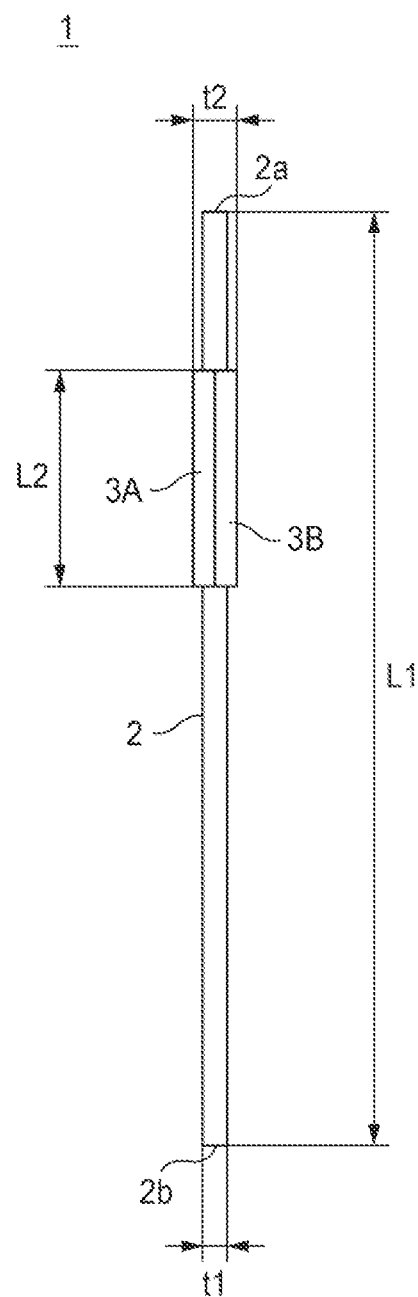
FIG. 3 is a side view of the tab lead shown in FIG. 2.

FIG. 2 is a perspective view showing a tab lead that is contained in the storage container shown in FIG. 1. FIG. 3 is a side view of the tab lead shown in FIG. 2. Referring to FIGS. 2 and 3, a tab lead 1 is a terminal for deriving electricity from a battery, and includes a conductor 2 having a rectangular main surface and a first end 2a and a second end 2b in a lengthwise direction, and an insulating film 3 that covers a portion of the conductor 2. The insulating film 3 is provided on the first end 2a side with respect to a center of the conductor 2 in the lengthwise direction.

More specifically, the conductor 2 is a foil made of metal such as aluminum or copper. For example, the conductor 2 has a length L1=20 mm to 90 mm in the lengthwise direction, a width d=10 mm to 80 mm in a transverse direction, and a thickness t1=0.1 mm to 3 mm. Compared with the length L1 in the lengthwise direction, the width d in the transverse direction may also be longer.

The insulating film 3 is configured by two sheets of a first film 3A and a second film 3B each having an inner layer and an outer layer. A width W of the insulating film 3 is longer than the width d of the conductor 2, so that the insulating film 3 is protruded from both end portions of the conductor 2 in the width direction. For example, the insulating film 3 has a length L2=5 mm to 20 mm in the lengthwise direction, a width W=20 mm to 110 mm, and a thickness t2=0.4 mm to 0.7 mm.

When manufacturing the tab lead 1, the inner layers of the first film 3A and the second film 3B are bonded to each other in a state in which the conductor 2 is sandwiched between the inner layers of the first film 3A and the second film 3B.

(Detailed Configuration of Pocket of Storage Container)

Figure 4:
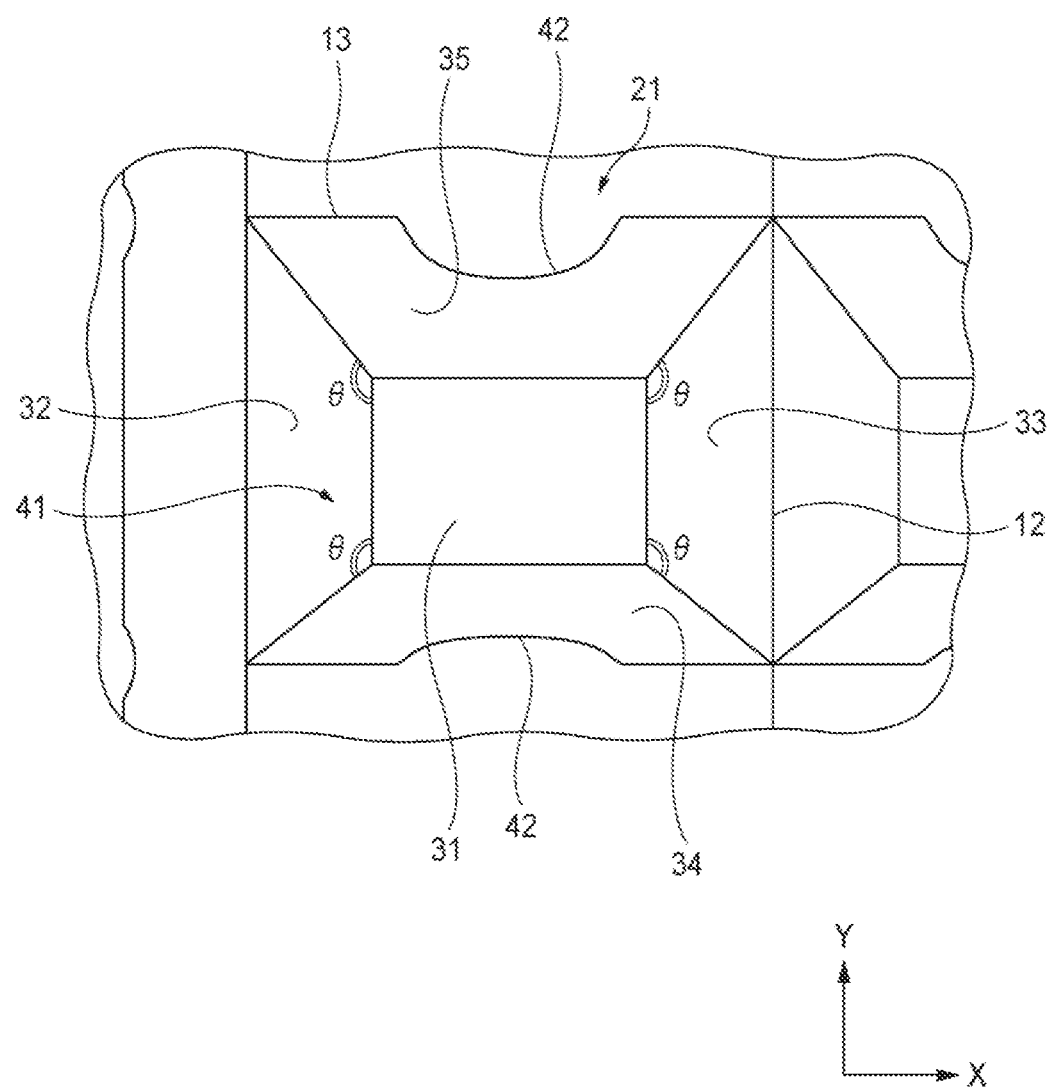
FIG. 4 is a top view showing a configuration of a pocket of the storage container shown in FIG. 1.

FIG. 4 is a top view showing a configuration of a pocket of the storage container shown in FIG. 1. Referring to FIG. 4, the pocket 21 has a bottom surface 31 and four side surfaces. The four side surfaces include a left side surface 32 and a right side surface 33 intersecting a straight line along the width direction of the bottom surface 31, i.e., the left-right direction, and a rear side surface 34 and a front side surface 35 parallel to the straight line.

In addition, an opening 41 is formed at an upper end of the pocket 21. That is, the opening 41 is formed by upper ends of the respective side surfaces. The pocket 21 has an inverted quadrangular pyramidal trapezoid shape in which an area of the opening 41 is larger than an area of the bottom surface 31. In a top view, it is seen that the bottom surface 31 is completely inside the opening 41. The left side 32 and the right side 33 each have an inverted trapezoid. That is, the left side surface 32 and the right side surface 33 each have a shape where a bottom side is shorter than an upper side and all interior angles θ of the trapezoid formed by the bottom side and both sides are obtuse angles. The trapezoid is preferably an isosceles trapezoid. In the present specification and claims, the term trapezoid includes one whose connecting portion of a bottom side and a side is a curved line.

The left side surface 32, the right side surface 33, the rear side surface 34, and the front side surface 35 are inclined with respect to the bottom surface 31 so that the area of the opening 41 is larger than the area of the bottom surface 31. More specifically, the left side surface 32 and the right side surface 33 are inclined so that slight gaps are formed between the side surfaces and the insulating films 3 of the respective tab leads 1 in a state in which the plurality of tab leads 1 are contained in the pocket 21 (hereinafter, referred to as "contained state").

As described later, the rear side surface 34 and the front side surface 35 are inclined so that a volume of a region occupied by a portion, which is below the upper end of the insulating films 3, of a bundle of the plurality of contained tab leads 1 is included within a range of 70% to 90% of a volume of the pocket 21 in the contained state.

Heights of the left side surface 32, the right side surface 33, the rear side surface 34, and the front side surface 35 in the vertical direction may be the same or different from each other.

The first connecting portion 12 is between a pocket 21 and another pocket 21 next to the pocket 21 in the left-right direction. The first connecting portion 12 is preferably a surface connecting the upper end of the right side surface 33 of the pocket 21 and the upper end of the left side surface 32 of the other adjacent pocket 21 because the main body part 10 is less likely to bend.

In addition, the second connecting portion 13 is between a pocket 21 and another pocket 21 next to the pocket 21 in the front-rear direction. The second connecting portion 13 is preferably a surface connecting the upper end of the front side surface 35 of the pocket 21 and the upper end of the rear side surface 34 of the other adjacent pocket 21 because the main body part 10 is less likely to bend.

A cutout 42 is formed at the upper end of each of the rear side surface 34 and the front side surface 35 of each pocket 21, and no cutout is formed at the connecting portion of the side surfaces. The cutout 42 has, for example, a U-shape, and is sized to allow a human finger to be inserted.

The second connecting portion 13 connects not only the upper end of the front side surface 35 of the pocket 21 and the upper end of the rear side surface 34 of the other adjacent pocket 21 but also the cutout 42 of the front side surface 35 of the pocket 21 and the cutout 42 of the rear side surface 34 of the other pocket 21.

Note that the pocket 21 is not limited to the configuration in which the cutout 42 is formed on each of the rear side surface 34 and the front side surface 35, and the cutout 42 may not be formed on at least one of the rear side surface 34 and the front side surface 35.

(Description of Contained State of Tab Lead)

Figure 5:
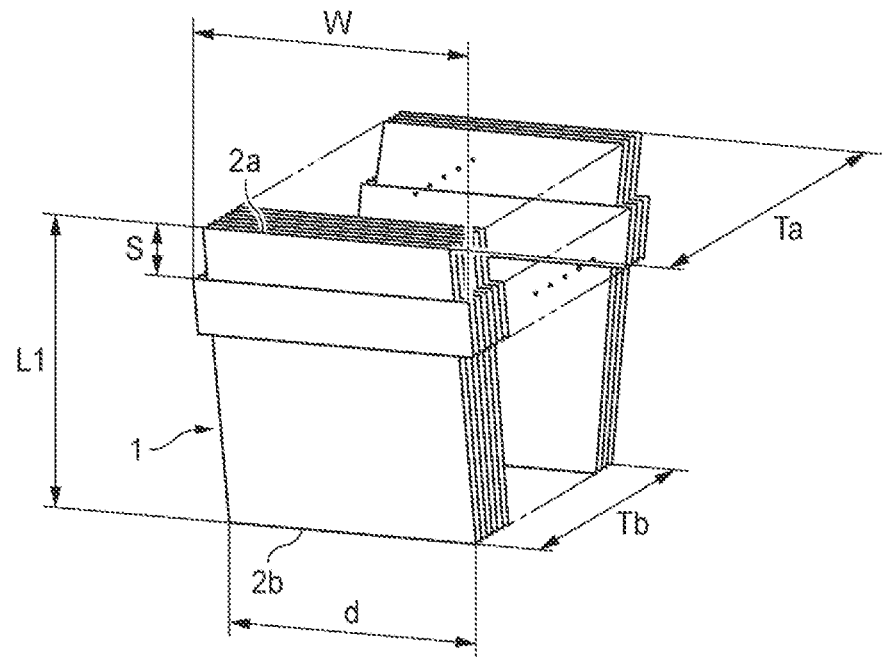
FIG. 5 is a view for illustrating that a plurality of tab leads are being contained in the pocket shown in FIG. 4.
Figure 5:
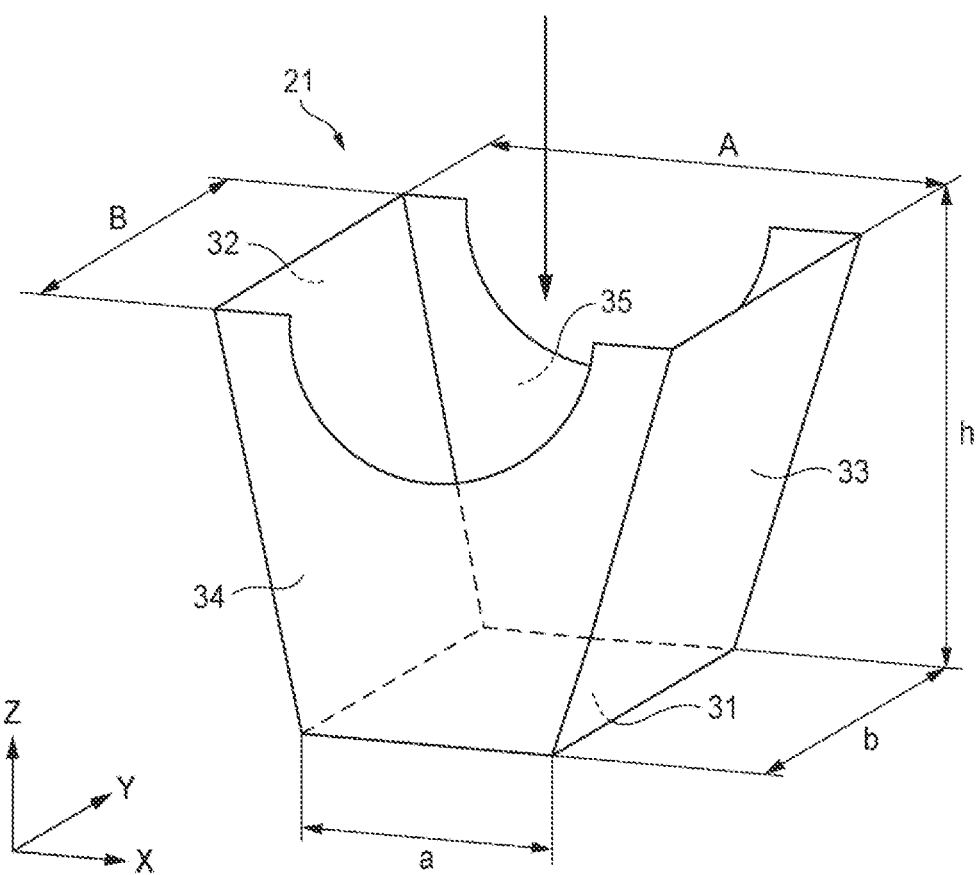
Figure 6:
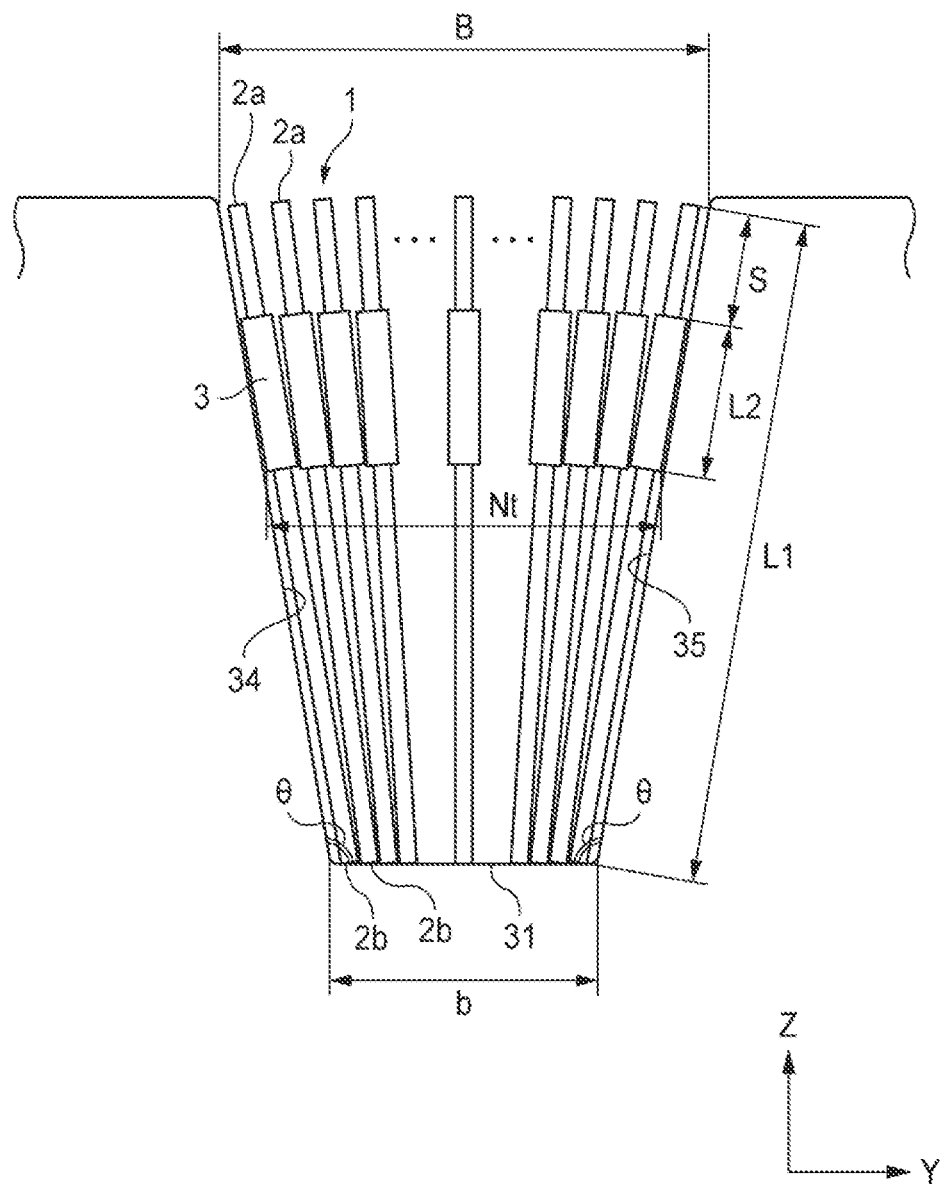
FIG. 6 is a view showing a state in which the plurality of tab leads are contained in the pocket shown in FIG. 4, as seen from the right side.

FIG. 5 is a view for illustrating a state in which a plurality of tab leads are being contained in the pocket shown in FIG. 4. In FIG. 5, shapes of a bundle of the plurality of tab leads 1 and the pocket 21 are simplified for easy understanding of the description. FIG. 6 is a view showing a state in which the plurality of tab leads are contained in the pocket shown in FIG. 4, as seen from the right side.

Referring to FIGS. 5 and 6, a bundle of, for example, 50 tab leads 1 is contained in one pocket 21. As described above, the tab lead 1 has the insulating film 3 provided on the first end 2a side with respect to the center of the conductor 2 in the lengthwise direction. For this reason, when the plurality of tab leads 1 are bundled, as shown in FIG. 6, the conductors 2 contact each other at the second ends 2b of the conductors 2, whereas the interval between the conductors 2 increases on the first end 2a side of the conductor 2 due to the thickness of the insulating film 3. As a result, the bundle of the plurality of tab leads 1 has an approximately inverted quadrangular pyramidal trapezoid shape, as shown in FIG. 5.

More specifically, when the insulating films 3 are overlapped without gaps, the tab leads 1 adjacent to each other come into close contact with each other at the portions of the insulating films 3, but the first ends 2a and the second ends 2b of the conductors 2 adjacent to each other form a gap corresponding to a difference between the thickness t2 of the insulating film 3 and the thickness t1 of the conductor 2. When the insulating films 3 are overlapped without gaps and the second ends 2b of the conductors 2 are overlapped without gaps, as shown in FIG. 6, the bundle of the plurality of tab leads 1 form a fan shape extending upward, when seen from a side.

The pocket 21 is formed such that a length, in the front-rear direction, of a portion corresponding to the insulating films 3 is substantially the same as a length, in the front-rear direction, of portions of the insulating films 3 in the bundle of tab leads 1. For this reason, when the bundle of tab leads 1 is contained in the pocket 21, as shown in FIG. 6, the insulating film 3 of the tab lead 1 closest to the rear side surface 34 is in contact with the rear side surface 34 and the insulating film 3 of the tab lead 1 closest to the front side surface 35 is in contact with the front side surface 35.

In addition, a length (inner length) b, in the front-rear direction, of the bottom surface 31 of the pocket 21 is slightly longer than a length Tb, in the front-rear direction, on the second end 2b side of the conductors 2 in the bundle of tab leads 1. That is, the inner length of the bottom surface 31 is formed to be a value slightly greater than a value obtained by multiplying the thickness t1 of the conductor 2 of the tab lead 1 by the number of tab leads 1 to be contained. For this reason, in the contained state, slight gaps are each formed between the second end 2b of the conductor 2 of the tab lead 1 closest to the rear side surface 34 and the rear side surface 34 and between the second end 2b of the conductor 2 of the tab lead 1 closest to the front side surface 35 and the front side surface 35.

Note that, in the contained state, a slight gap may be formed between the second ends 2b of the respective conductors 2. In this case, a distance between the first ends 2a of the conductors 2 adjacent to each other becomes shorter, as compared with a case where no gap is formed between the second ends 2b of the respective conductors 2.

Figure 7:
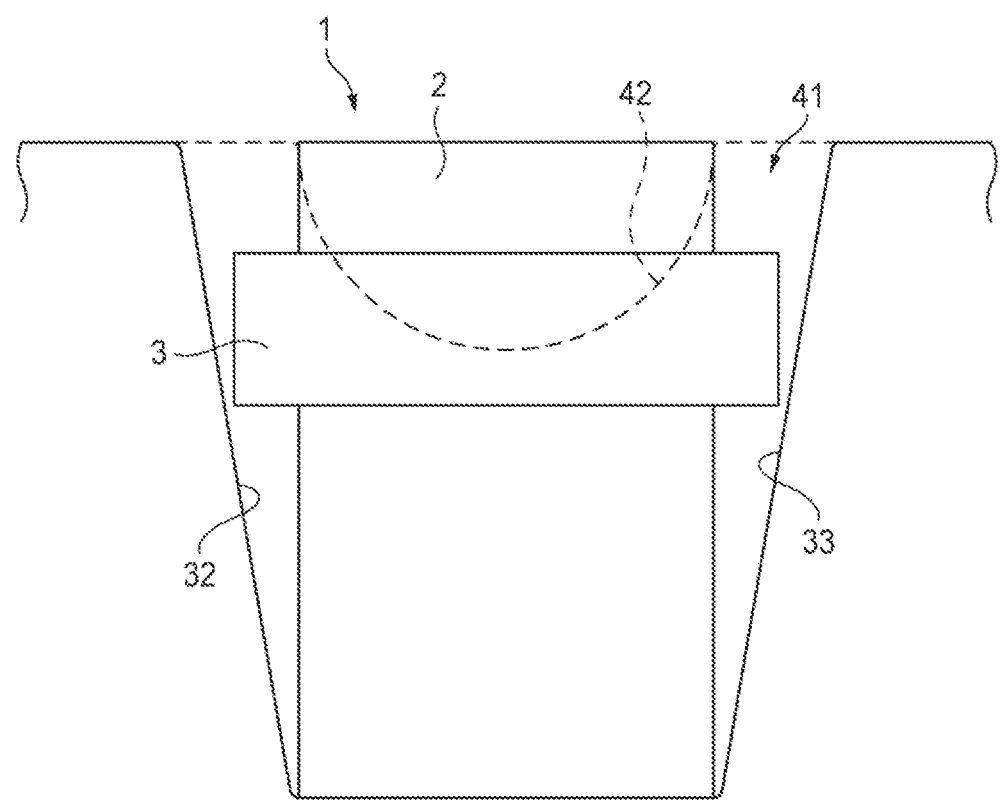
FIG. 7 is a view showing a state in which the plurality of tab leads are contained in the pocket shown in FIG. 4, as seen from the rear side.

FIG. 7 is a view showing a state in which the plurality of tab leads are contained in the pocket shown in FIG. 4, as seen from the right side. Referring to FIG. 7, in the contained state, the left side surface 32 and the right side surface 33 are not in contact with the insulating film 3 of each tab lead 1, and each form a slight gap with a lower end of the insulating film 3.

In addition, in the contained state, a portion of the conductor 2 and a portion of the insulating film 3 of the tab lead 1 closest to the rear side surface 34 are exposed from the cutout 42 formed on the rear side surface 34. Similarly, also on the front side surface 35 side, in the contained state, a portion of the conductor 2 and a portion of the insulating film 3 of the tab lead 1 closest to the front side surface 35 are exposed from the cutout 42 formed on the front side surface 35.

Referring again to FIG. 5, the pocket 21 is formed so that a volume of a region occupied by a portion, which is below the upper end of the insulating films 3, of the bundle of the plurality of contained tab leads 1 is included within a range of 70% to 90% of a volume of the pocket 21 in the contained state.

For example, as shown in FIG. 5, a bundle of 50 tab leads 1 is intended to be contained in one pocket 21. A volume Vt of a region occupied by portions, which are below the upper end of the insulating films, of the bundle of 50 tab leads 1 contained in the pocket 21 can be obtained using a method of calculating a volume of an inverted quadrangular pyramidal trapezoid formed by the bundle. Specifically, it is assumed that a length in the lengthwise direction of a portion, which is below the upper end of the insulating films 3, of the bundle of tab leads 1 is (L1-S), a width of the conductor 2 is d, a width of the insulating film is W, a thickness on the first end 2a side in the front-rear direction is Ta, and a thickness on the second end 2b side in the front-rear direction is Tb. S is a length from the upper end of the insulating film 3 to the first end 2a of the conductor 2.

In this case, the volume Vt of the inverted quadrangular pyramidal trapezoidal shape formed by the bundle of tab leads 1, i.e., the volume Vt of a region of the pocket 21 occupied by portions, which are below the upper end of the insulating films, of the bundle of tab leads 1 is calculated by equation (1).

$$Vt=(L1-S)\times\{d\cdot Ta+W\cdot Tb+2(W\cdot Ta+d\cdot Tb)\}/6 \tag{1}$$

When such a bundle of tab leads 1 is a target to be contained, a size of the bottom surface 31 of the pocket 21 and an inclination angle and size of each side surface are set so that Vt is 70% to 90% of a volume Vp of the pocket 21.

For example, a width a of the bottom surface 31 in the left-right direction is set to coincide with the width d of the conductor 2 of the tab lead 1 shown in FIG. 2 in direction and length. Here, even if there is a slight difference in length between the width a and the width d, it is considered to be included in "coincide". The slight difference is within a range of 0.01 mm to 0.3 mm, for example.

Specifically, the width a of the bottom surface 31 is set to 'a=45.2 mm' so that both ends in the left-right direction of the second end 2b side of the conductor 2 each have a slight gap with the left side surface 32 and the right side surface 33 of the pocket 21, respectively. In addition, a length h in the lengthwise direction of the pocket 21 is set to be slightly longer than a length L1 of the conductor 2 of the tab lead 1.

As described above, the inclination angles of the left side surface 32 and the right side surface 33 of the pocket 21 are set with respect to the bottom surface 31 such that slight gaps are each formed between the side surfaces and the insulating film 3 of the tab lead 1. Thereby, the width A in the left-right direction of the opening 41 at the upper end of the pocket 21 is set to 'A=61 mm', for example.

Referring to FIG. 6, the thickness b in the front-rear direction of the bottom surface 31 of the pocket 21 is calculated by equation (2). In equation (2), Nt is a thickness on lower end side of the insulating film 3, and the thickness Nt on the lower end side of the insulating film 3 corresponds to a value obtained by multiplying the thickness t2 of the insulating film 3 shown in FIG. 3 by the number N of tab leads 1 contained in one pocket 21 (Nt=t2×N).

$$b=Nt-2\times\sin\theta\times(L1-S-L2) \tag{2}$$

The thickness b in the front-rear direction of the bottom surface 31 of the pocket 21 calculated by equation (2) is set slightly longer than the thickness Tb in the front-rear direction on the second end 2b side of the bundle of 50 tab leads 1 shown in FIG. 5.

A thickness B in the front-rear direction of the opening 41 of the pocket 21 is calculated by equation (3).

$$B = b - 2 \times h / \tan \theta \tag{3}$$

Using the values of A, B, a, b and h set in this way, the volume Vp of the pocket 21 can be calculated by the method of calculating a volume of an inverted quadrangular pyramidal trapezoid.

In addition, the values of b and h are adjusted so that the volume Vt of the region occupied by the portion, which is below the upper end of the insulating films 3, of the bundle of the plurality of tab leads 1 is included within the range of 70% to 90% of the volume Vp of the pocket 21. When the values of b and h adjusted in this way are used, the volume Vp of the pocket 21 is calculated by equation (4).

$$Vp = h \times \{ a \cdot B + A \cdot b + 2(A \cdot B + a \cdot b) \} / 6 \tag{4}$$

(i) Example 1

Specifically, each dimension of a bundle of 50 tab leads 1 is set as follows:
- length L1-S in the lengthwise direction of the portion below the upper end of the insulating film 3=36.5 mm,
- width d of the conductor 2=45 mm,
- width W of the insulating film 3=55 mm,
- thickness Ta in the front-rear direction on the first end 2a side=36.8 mm, and
- thickness Tb in the front-rear direction on the second end 2b side=30 mm.

In this case, the volume Vt is 61161.8 mm³.

In addition, each dimension of the pocket 21 is set as follows:
- height h of the pocket 21=45.5 mm,
- width A of the upper surface of the pocket 21=61 mm,
- width a of the lower surface of the pocket 21=45 mm,
- inner length B of the upper surface of the pocket 21=38 mm, and
- inner length b of the lower surface of the pocket 21=30.7 mm.

In this case, the volume Vp of the pocket 21 is 79157.1 mm³, and Vt/Vp is 77%.

(ii) Example 2

In addition, each dimension of the bundle of 50 tap leads 1 is set as follows:
- length L1-S in the lengthwise direction of the portion below the upper end of the insulating film 3=41.5 mm,
- width d of the conductor 2=45 mm,
- width W of insulating film=55 mm,
- thickness Ta in the front-rear direction on the first end 2a side=37.7 mm, and
- thickness Tb in the front-rear direction on the second end 2b side=30 mm.

In this case, the volume Vt of the tab leads is 70505.0 mm³.

In addition, each dimension of the pocket 21 is made similar to Example 1. In this case, Vt/Vp is 89/a.

(Tab Lead Storage Operation)

Figure 8:
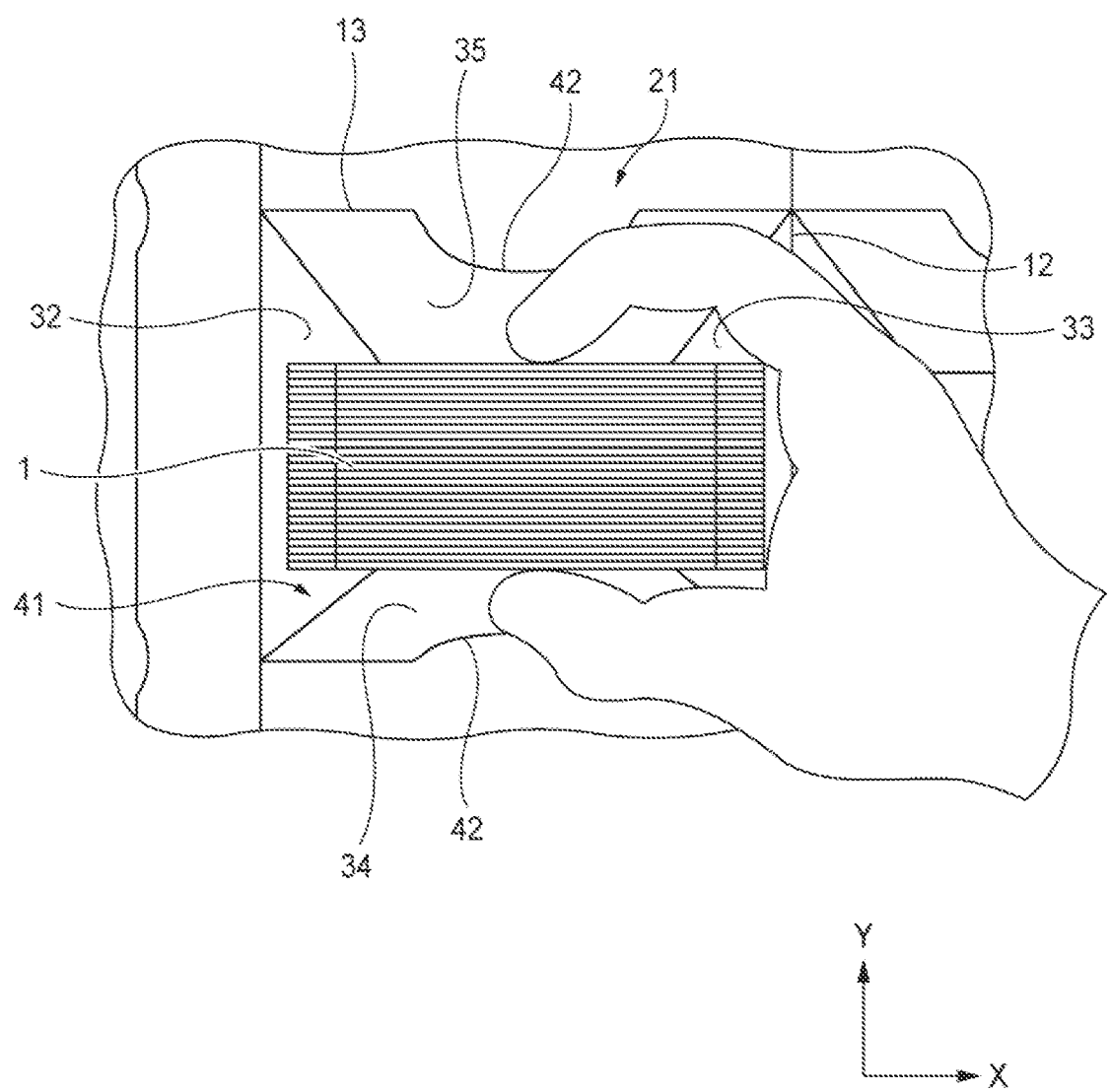
FIG. 8 is a view for illustrating an operation of storing a plurality of tab leads into the pocket shown in FIG. 4.

FIG. 8 is a view for illustrating an operation of storing a plurality of tab leads into the pocket shown in FIG. 4. FIG. 8 shows a state in which a bundle of a plurality of tab leads 1 is being contained in the pocket 21, i.e., a state in which a lower end of the bundle of tab leads 1 is above the bottom surface 31 of the pocket 21. Referring to FIG. 8, for example, when storing a bundle of 50 tab leads 1 in one pocket 21, an operator holds the bundle of 50 tab leads 1 and inserts the same into the pocket 21. At this time, the operator adjusts a direction of the bundle so that a direction in which the plurality of tab leads 1 are aligned follows the front-rear direction.

In addition, at this time, since the cutouts 42 are formed on the rear side surface 34 and the front side surface 35, an operator's fingers can be prevented from coming into contact with the main body part 10 of the storage container 100. Thereby, the operator can hold the bundle of tab leads 1 with his/her fingers until the second ends 2b of the tab leads 1 reach the bottom surface 31 of the pocket 21.

In this way, after storing the bundle of tab leads 1 in each pocket 21, the operator puts a cushion material on each bundle, and further covers the cover part 11 from above the main body part 10. At this time, the operator presses the cover part 11 downward until the cover part 11 comes into contact with the upper end of the main body part 10. When the cover part 11 is pressed downward and the second fitting portions 17 of the cover part 11 reach the first fitting portions 16 of the main body part 10, the plurality of second fitting portions 17 are fitted with the plurality of first fitting portions 16 corresponding thereto, so that the cover part 11 is fixed to the main body part 10. When there is a space between the lower surface of the cover part 11 and the tab leads 1 contained in the main body part 10 in a state in which the cover part 11 is covered and fixed to the main body part 10, a cushioning material is preferably placed in the space.

Note that the number of tab leads 1 contained in one pocket 21 is not limited to 50 tab leads, and may also be another number such as 25. The shape of the pocket 21, i.e., the size of the bottom surface 31, and the inclination angle and size of each side surface are appropriately set corresponding to the shape and number of tab leads 1 to be contained.

Although the present disclosure has been described with reference to the specific embodiment, the present invention is not limited to these examples, is defined by the claims and is intended to include all changes made within the meaning and scope equivalent to the claims.

What is claimed is:

1. A container for a tab lead comprising:
   a main body part configured to contain a plurality of tab leads; and
   a cover part configured to cover the main body part,
   wherein each of the tab leads comprises a conductor, which is a foil having a rectangular main surface, and an insulating film configured to cover a portion of the conductor and protruded from both ends in a width direction of the conductor,
   wherein the main body part has a pocket,
   wherein the pocket has an inverted quadrangular pyramidal trapezoid shape having a bottom surface and four side surfaces, in which an area of an opening at an upper end of the pocket is larger than an area of the bottom surface,
   wherein a width of the bottom surface coincides with a width of the conductor of the tab lead in direction and length,
   wherein the four side surfaces comprise a left side surface and a right side surface intersecting a straight line along a width direction of the bottom surface, and a front side surface and a rear side surface parallel to the straight line,
   wherein the left side surface and the right side surface are not in contact with the insulating film of each of the tab leads in a state in which the plurality of tab leads are contained in the pocket, wherein the front side surface is in contact with the insulating film of the tab lead closest to the front side surface in the state, wherein the rear side surface is in contact with the insulating film of the tab lead closest to the rear side surface in the state, wherein the left side surface and the right side surface each have a trapezoid where a bottom side is shorter than an upper side and all interior angles of the trapezoid formed by the bottom side and sides are obtuse angles, and wherein the pocket is configured such that a volume of a region occupied by portions, which are below an upper end of the insulating films, of the plurality of tab leads in a state in which the plurality of tab leads are contained in the pocket is included within a range of 70% to 90% of a volume of the pocket.

2. The container for a tab lead according to claim 1, wherein a cutout is formed at an upper end of each of the front and rear side surfaces, wherein a portion of the conductor of the tab lead and a portion of the insulating film are exposed from the cutout in a state in which the plurality of tab leads are contained in the pocket, and wherein no cutout is formed at a connecting portion of the side surfaces.

3. The container for a tab lead according to claim 1, wherein the main body part has a plurality of the pockets formed along a front-rear direction.

4. The container for a tab lead according to claim 1, wherein the main body part has a plurality of the pockets formed along a left-right direction.

5. The container for a tab lead according to claim 1, wherein the main body part has the m pockets formed along the front-rear direction, and the n pockets formed along a left-right direction orthogonal to the front-rear direction, m being a natural number of 2 or greater, and n being a natural number of 2 or greater.

6. A combination of a tab lead and a container comprising:
a plurality of tab leads; and
a container configured to contain the plurality of tab leads, wherein the container comprises a main body part, and a cover part configured to cover the main body part, wherein each of the tab leads comprises a conductor, which is a foil having a rectangular main surface, and an insulating film configured to cover a portion of the conductor and protruded from both ends in a width direction of the conductor, wherein the main body part has a pocket, wherein the pocket has an inverted quadrangular pyramidal trapezoid shape having a bottom surface and four side surfaces, in which an area of an opening at an upper end of the pocket is larger than an area of the bottom surface, wherein a width of the bottom surface coincides with a width of the conductor of the tab lead in direction and length, wherein the four side surfaces comprise a left side surface and a right side surface intersecting a straight line along a width direction of the bottom surface, and a front side surface and a rear side surface parallel to the straight line, wherein the left side surface and the right side surface are not in contact with the insulating film of each of the tab leads in a state in which the plurality of tab leads are contained in the pocket, wherein the front side surface is in contact with the insulating film of the tab lead closest to the front side surface in the state, wherein the rear side surface is in contact with the insulating film of the tab lead closest to the rear side surface in the state, wherein the left side surface and the right side surface each have a trapezoid where a bottom side is shorter than an upper side and all interior angles of the trapezoid formed by the bottom side and sides are obtuse angles, and wherein the pocket is configured such that a volume of a region occupied by portions, which are below an upper end of the insulating films, of the plurality of tab leads in a state in which the plurality of tab leads are contained in the pocket is included within a range of 70% to 90% of a volume of the pocket.

* * * * *